United States Patent
Jiang et al.

(10) Patent No.: US 9,842,434 B2
(45) Date of Patent: Dec. 12, 2017

(54) SYSTEM AND METHOD FOR REPRODUCING OBJECTS IN 3D SCENE

(71) Applicant: Qingdao GoerTek Technology Co.,Ltd., Qingdao (CN)

(72) Inventors: Maoshan Jiang, Qingdao (CN); Xiangjun Zhang, Qingdao (CN); Hongwei Zhou, Qingdao (CN)

(73) Assignee: Qingdao GoerTek Technology Co., Ltd., Qingdao (CN)

( * ) Notice: Subject to any disclaimer, the term of this patent is extended or adjusted under 35 U.S.C. 154(b) by 0 days.

(21) Appl. No.: 15/313,446

(22) PCT Filed: Sep. 24, 2015

(86) PCT No.: PCT/CN2015/090529
§ 371 (c)(1),
(2) Date: Nov. 22, 2016

(87) PCT Pub. No.: WO2016/107230
PCT Pub. Date: Jul. 7, 2016

(65) Prior Publication Data
US 2017/0098331 A1   Apr. 6, 2017

(30) Foreign Application Priority Data

Dec. 30, 2014 (CN) .......................... 2014 1 0842257

(51) Int. Cl.
*G06T 19/00* (2011.01)
*G06T 7/20* (2017.01)
*G06T 7/73* (2017.01)

(52) U.S. Cl.
CPC .............. *G06T 19/006* (2013.01); *G06T 7/20* (2013.01); *G06T 7/73* (2017.01); *G06T 2207/10016* (2013.01); *G06T 2207/30241* (2013.01)

(58) Field of Classification Search
CPC ....... G06T 17/00; G06T 19/006; G06T 15/02; G06T 2207/10016; G06T 2207/10012;
(Continued)

(56) References Cited

U.S. PATENT DOCUMENTS

| | | | | |
|---|---|---|---|---|
| 2010/0333006 A1* | 12/2010 | Ostergard | ............ | G02B 26/005 715/768 |
| 2014/0307920 A1* | 10/2014 | Holz | .................. | G06K 9/00335 382/103 |
| 2015/0379770 A1* | 12/2015 | Haley, Jr. | ........... | G02B 27/0172 345/633 |

FOREIGN PATENT DOCUMENTS

| CN | 1648840 A | 8/2005 |
|---|---|---|
| CN | 1747559 A | 3/2006 |

(Continued)

OTHER PUBLICATIONS

International Search Report dated Dec. 16, 2015 for PCT Application No. PCT/CN2015/090529.
(Continued)

*Primary Examiner* — Haixia Du
(74) *Attorney, Agent, or Firm* — Moser Taboada (57) ABSTRACT

The present disclosure discloses a system and a method for reproducing an object in a 3D scene. The system comprises an object acquiring unit configured to simultaneously acquire at least two channels of video stream data in real time at different angles for an object to be displayed; an object recognizing unit configured to recognize a shape of the object varying in real time from the at least two channels of video stream data; an object tracking unit configured to obtain corresponding object motion trajectory according to the shape of the object varying in real time; and an object projecting unit configured to process the shape of the object varying in real time and the corresponding object motion trajectory into a 3D image and superposition-project the 3D
(Continued)

image into the 3D scene in real time. The technical solutions of the present disclosure can reproduce the object in the 3D scene, and achieve the purpose of displaying the real object in the 3D scene.

8 Claims, 3 Drawing Sheets

(58) Field of Classification Search
CPC .......... G06T 2207/10028; G06T 13/20; G06T 19/00; G06T 7/593; G06T 15/205; G06T 2207/10021; G06T 2207/30241; G06T 2215/16; G06T 7/292; G06T 2200/08; G06T 7/50; G06T 7/55; G06T 7/97; G06T 15/00; G06K 9/00208; G06K 9/00771; G06K 9/00288; G06K 9/00624; G06K 9/00201; H04N 13/0242; H04N 13/044; H04N 2013/0081; H04N 13/0217; G06F 3/011
See application file for complete search history.

(56) References Cited

FOREIGN PATENT DOCUMENTS

| CN | 101742348 A | 6/2010 |
|---|---|---|
| CN | 102156859 A | 8/2011 |
| CN | 102722249 A | 10/2012 |
| CN | 103927016 A | 7/2014 |
| CN | 104571511 A | 4/2015 |
| CN | 204463031 U | 7/2015 |

OTHER PUBLICATIONS

Written Opinion of the International Searching Authority dated Dec. 16, 2015 for PCT Application No. PCT/CN2015/090529.
Chinese First Office Action dated Mar. 23, 2017 for Application No. 201410842257.1.

* cited by examiner

SYSTEM AND METHOD FOR REPRODUCING OBJECTS IN 3D SCENE

TECHNICAL FIELD

The present disclosure relates to the technical field of virtual reality, and particularly, to a system and a method for reproducing an object in a 3D scene.

BACKGROUND

In the future, the virtual reality technology will become a new breakthrough for changing people's life style. Currently, how the virtual reality technology interacts with a target in the virtual world is a great challenge to the virtual reality technology, and thus there is still a long way for the virtual reality technology to really enter the consumer market.

Currently, various existing virtual reality equipments still obstruct the communications between the user and the virtual world. For example, in 3D scenes, the changes of the shape and the displacement of an object cannot be displayed in real time, and the object cannot be really reproduced.

SUMMARY

The present disclosure provides a system and a method for reproducing an object in a 3D scene, so as to solve the problem in the prior art that the object cannot be really reproduced in 3D scenes.

In order to achieve the above objective, the technical solutions of the present disclosure are realized as follows:

In one aspect, the present disclosure provides a system for reproducing an object in a 3D scene, comprising:

an object acquiring unit configured to simultaneously acquire at least two channels of video stream data in real time at different angles for an object to be displayed;

an object recognizing unit configured to recognize a shape of the object varying in real time from the at least two channels of video stream data;

an object tracking unit configured to obtain corresponding object motion trajectory according to the shape of the object varying in real time; and an object projecting unit configured to process the shape of the object varying in real time and the corresponding object motion trajectory into a 3D image and superposition-project the 3D image into the 3D scene in real time.

Preferably, the object recognizing unit comprises:

a sampling module configured to perform a sampling processing of each of the at least two channels of video stream data to obtain video image data sampled each time;

a contour extracting module configured to judge whether the video image data contain an object, and if so, perform a binarization processing of the video image data to extract object contour information;

a shape recognizing module configured to recognize a shape of the object corresponding to the object contour information from a preset object model database; and a shape synthetizing module configured to synthetize shapes of the object recognized after each sampling of respective channels of video stream data to obtain a shape of the object varying in real time.

Preferably, the object tracking unit comprises:

a position information obtaining module configured to obtain relative spatial position information of the shape of the object varying in real time;

a contact information obtaining module configured to obtain variation information of a determined contact on the shape of the object varying in real time, according to the contact on the shape of the object varying in real time, wherein the contact is a characteristic key point for identifying the object; and a motion trajectory obtaining module configured to obtain corresponding object motion trajectory from a preset motion trajectory database, according to the relative spatial position information and the variation information of the contact.

Preferably, the position information obtaining module is specifically configured to:

obtain angle information with the shape of the object varied, from video image information of the at least two channels of video data streams;

obtain distance information of the object according to the angle information with the shape of the object varied, or sense distance information of the object in real time through a distance sensor; and obtain the relative spatial position information of the object according to the angle information with the shape of the object varied and the distance information of the object.

Preferably, the object projecting unit is further configured to process the shape of the object varying in real time and the corresponding object motion trajectory into a 3D image and project the 3D image into the 3D scene according to a screen splitting technology.

In another aspect, the present disclosure provides a method for reproducing an object in a 3D scene, comprising:

simultaneously acquiring at least two channels of video stream data in real time at different angles for an object to be displayed;

recognizing a shape of the object varying in real time from the at least two channels of video stream data;

obtaining corresponding object motion trajectory according to the shape of the object varying in real time; and processing the shape of the object varying in real time and the corresponding object motion trajectory into a 3D image and superposition-projecting the 3D image into the 3D scene in real time.

Preferably, the recognizing a shape of the object varying in real time from the at least two channels of video stream data comprises:

performing a sampling processing of each of the at least two channels of video stream data to obtain video image data sampled each time;

judging whether the video image data contain an object, and if so, performing a binarization processing of the video image data to extract object contour information;

recognizing a shape of the object corresponding to the object contour information from a preset object model database; and synthetizing shapes of the object recognized after each sampling of respective channels of video stream data to obtain a shape of the object varying in real time.

Preferably, the obtaining corresponding object motion trajectory according to the shape of the object varying in real time comprises:

obtaining relative spatial position information of the shape of the object varying in real time;

obtaining variation information of a determined contact on the shape of the object varying in real time, according to the contact on the shape of the object varying in real time, wherein the contact is a characteristic key point for identifying the object; and obtaining corresponding object motion trajectory from a preset motion trajectory database, according to the relative spatial position information and the variation information of the contact.

Preferably, the obtaining relative spatial position information of the shape of the object varying in real time comprises:

obtaining angle information with the shape of the object varied, from video image information of the at least two channels of video data streams;

obtaining distance information of the object according to the angle information with the shape of the object varied, or sensing distance information of the object in real time through a distance sensor; and obtaining the relative spatial position information of the object according to the angle information with the shape of the object varied and the distance information of the object.

Preferably, the processing the shape of the object varying in real time and the corresponding object motion trajectory into a 3D image and superposition-projecting the 3D image into the 3D scene in real time comprises:

processing the shape of the object varying in real time and the corresponding object motion trajectory into a 3D image; and projecting the 3D image into the 3D scene according to a screen splitting technology.

The embodiments of the present disclosure have the following beneficial effect: the embodiments of the present disclosure disclose a system and a method for reproducing an object in a 3D scene. In the system, the object acquiring unit simultaneously acquires at least two channels of video stream data in real time at different angles for an object to be displayed; the object recognizing unit recognizes a shape of the object having complete information of the object from the at least two channels of video stream data; the object tracking unit obtains corresponding object motion trajectory of the shape of the object varying in real time; and the object projecting unit processes the shape of the object varying in real time and the corresponding object motion trajectory into a 3D image, and superposition-projects the 3D image into the 3D scene in real time, thereby achieving the purpose of displaying the real object in the 3D scene. As compared with the prior art, the present disclosure does not need to redraft the object to be displayed according to the shapes of the object in the database, and can directly and really display the acquired image of the object, so as to improve the user's usage experience.

BRIEF DESCRIPTION OF THE DRAWINGS

The drawings are provided for a further understanding of the present disclosure, and constitute part of the Specification. The drawings are used together with the embodiments of the present disclosure to explain the present disclosure, rather than making any limitation to the present disclosure, in which.

DETAILED DESCRIPTION

In order that the objective, technical solutions and advantages of the present disclosure are clearer, the embodiments of the present disclosure will be further described in details as follows with reference to the drawings.

The whole idea of the present disclosure is to acquire an object in real time at different angles using at least two cameras, recognize a shape of the object according to video stream data acquired by each camera, obtain corresponding object motion trajectory according to the recognized shape of the object, process the shape of the object varying in real time and the corresponding object motion trajectory into a 3D image and superposition-project the 3D image into the 3D scene in real time, so as to reproduce a real object in the 3D scene.

Figure 1:
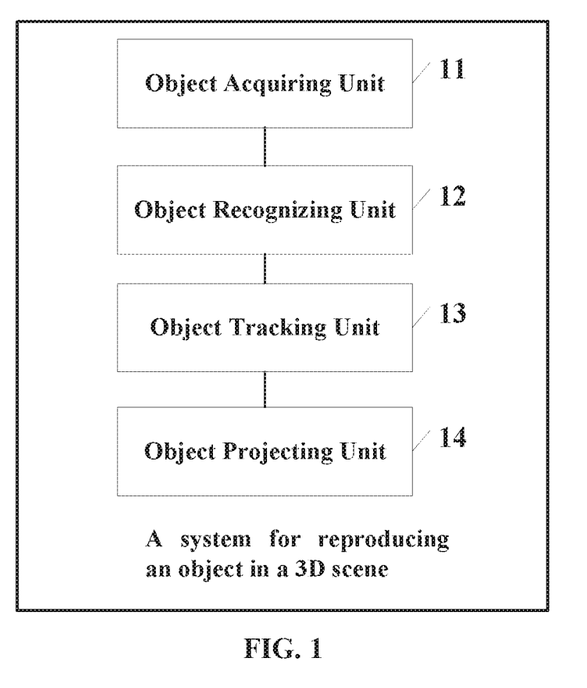
FIG. 1 is a structure diagram of a system for reproducing an object in a 3D scene provided by an embodiment of the present disclosure.

FIG. 1 is a structure diagram of a system for reproducing an object in a 3D scene provided by an embodiment of the present disclosure. The system comprises: an object acquiring unit 11, an object recognizing unit 12, an object tracking unit 13 and an object projecting unit 14.

The object acquiring unit 11 is configured to simultaneously acquire at least two channels of video stream data in real time at different angles for an object to be displayed.

In that, the object acquiring unit 11 can acquire the object to be displayed in real time at different angles through a plurality of cameras, so as to obtain a plurality of channels of video stream data. In practical application, an appropriate amount of cameras may be selected to acquire corresponding number of channels of video stream data, according to the system data processing capacity and the system accuracy requirement. To be noted, the camera in the object acquiring unit 11 may be a white light camera of common performances, or an infrared camera, and the object acquiring unit is not particularly limited in this embodiment.

The object recognizing unit 12 is configured to recognize a shape of the object varying in real time from the at least two channels of video stream data.

The object tracking unit 13 is configured to obtain corresponding object motion trajectory according to the shape of the object varying in real time.

The object projecting unit 14 is configured to process the shape of the object varying in real time and the corresponding object motion trajectory into a 3D image and superposition-project the 3D image into the 3D scene in real time.

In practical application, the object projecting unit 14 is configured to process the shape of the object varying in real time and the corresponding object motion trajectory into a 3D image, and project the 3D image into the 3D scene according to a screen splitting technology. Namely, the 3D scene is displayed on a main display screen, and the shape of the object varying in real time and the corresponding object motion trajectory processed into the 3D image is displayed on another display screen, so that a 3D scene containing the shape and the displacement of the object is presented to the human eyes through relevant optical principles.

In this embodiment, the object acquiring unit acquires at least two channels of video stream data in real time for the object; the object recognizing unit recognizes a shape of the object having complete object information from the at least two channels of video stream data; the object tracking unit obtains corresponding object motion trajectory; and the object projecting unit processes the shape of the object varying in real time and the corresponding object motion trajectory into a 3D image and superposition-projects the 3D image into the 3D scene in real time, so as to achieve the purpose of reproducing a real object in the 3D scene.

Preferably, the object recognizing unit 12 in the embodiment as illustrated in FIG. 1 comprises a sampling module, a contour extracting module, a shape recognizing module, and a shape synthetizing module.

The sampling module is configured to perform a sampling processing of each of the at least two channels of video stream data to obtain video image data sampled each time.

The contour extracting module is configured to judge whether the video image data contain an object, and if so, perform a binarization processing of the video image data to extract object contour information.

The shape recognizing module is configured to recognize a shape of the object corresponding to the object contour information from a preset object model database.

As an example, the object model database stores various object models, which may be body parts such as hand, head, etc. of a living person, or mechanical and electronic devices. In that case, the shape recognizing module can recognize the object contour information according to various object models in the object model database to obtain corresponding shape of the object.

The shape synthetizing module is configured to synthetize shapes of the object recognized after each sampling of respective channels of video stream data to obtain a shape of the object varying in real time.

In practical application, since each channel of video stream data uses part of the object, and a complete object cannot be obtained at the same timing, this embodiment adopts the shape synthetizing module to perform a synthesis processing of the shapes of the object recognized after each sampling of respective channels of video stream data, so as to obtain a shape of the object containing more information.

As described above, the shape recognizing unit recognizes corresponding shape of the object according to object contour information in each channel of video stream data, and performs a synthesis processing of the shapes of the object recognized in the multiple channels of video stream data to obtain a shape of the object containing all the information of the object, thereby enhancing the real effect of the object reproduced in the 3D scene and improving the user's usage experience.

Preferably, the object tracking unit in the preferred embodiment as illustrated in FIG. 1 comprises a position information obtaining module, a contact information obtaining module and a motion trajectory obtaining module.

The position information obtaining module is configured to obtain relative spatial position information of the shape of the object varying in real time.

When a plurality of cameras shoot the object at the same timing at different angles, the light emitted from each camera forms an angle with the object, and when the object moves or varies, the angle formed by the light emitted from each camera and the object may be changed, while the changes of those angles are reflected as changes of the spatial position in the video stream image data. Therefore, this technical solution obtains the relative spatial position information of the shape of the object varying in real time based on the objective fact.

Specifically, the present disclosure schematically illustrates two manners of obtaining the relative spatial position information of the shape of the object varying in real time, in which, the first manner of obtaining the relative spatial position information of the shape of the object is:

The position information obtaining module obtains angle information with the shape of the object varied, from video image information of the at least two channels of video data streams acquired by the object acquiring unit; obtains distance information of the object according to the angle information with the shape of the object varied; and obtains the relative spatial position information of the object by combining the angle information with the shape of the object varied and the distance information of the object.

The second manner of obtaining the relative spatial position information of the shape of the object is:

The position information obtaining module obtains angle information with the shape of the object varied, from video image information of the at least two channels of video data streams acquired by the object acquiring unit; senses distance information of the object in real time through a distance sensor; and obtains the relative spatial position information of the object by combining the angle information with the shape of the object varied and the distance information of the object.

Both the schemes improve the accuracy of the obtained relative spatial position information of the shape of the object by combining the angle information with the shape of the object varied and the real-time distance information of the object. In those, the first scheme obtains the relative spatial position information of the shape of the object merely through information provided by the video stream data, without additionally using any sensor, but an advanced algorithm is required and the system computation is more complex. The second scheme senses the distance variation of the object in real time through a distance sensor, and obtains the relative spatial position information of a high accuracy just in a simple algorithm. In practical application, an appropriate scheme may be selected according to the specific design requirement.

The contact information obtaining module is configured to obtain variation information of a determined contact on the shape of the object varying in real time, according to the contact on the shape of the object varying in real time, wherein the contact is a characteristic key point for identifying the object.

To be noted, the contact in the module is a characteristic key point for identifying the object, and the key point preferably is each articulation point of the moving object, so as to better determine the shape of the object varying in real time. This technical solution does not particularly limit the number and the setting mode of the contacts on the shape of the object, which can be specifically designed in a design process by comprehensively considering the requirements of for example accuracy and data processing capacity of the system.

The motion trajectory obtaining module is configured to obtain corresponding object motion trajectory from a preset motion trajectory database, according to the relative spatial position information and the variation information of the contact.

In order to describe the beneficial effects of the technical solution in more details, the description is made by taking an example in which an object is reproduced on a virtual reality head-mounted device.

The virtual reality head-mounted device comprises a display screen for displaying a 3D virtual reality scene, and the system for reproducing an object in a 3D scene in the above technical solution, wherein the object acquiring unit of the system for reproducing an object in a 3D scene consists of a front camera and a bottom camera provided on the virtual reality head-mounted device.

The working principle of reproducing an object on the virtual reality head-mounted device is to obtain two channels of video stream data by simultaneously acquiring the object in real time through the front camera and the bottom camera, recognize a shape of the object from the two channels of video stream data, obtain corresponding displacement of the object according to the shape of the object varying in real time, process the displacement of the object into a 3D image and superposition-project the 3D image in the 3D virtual reality scene in real time.

Figure 2:
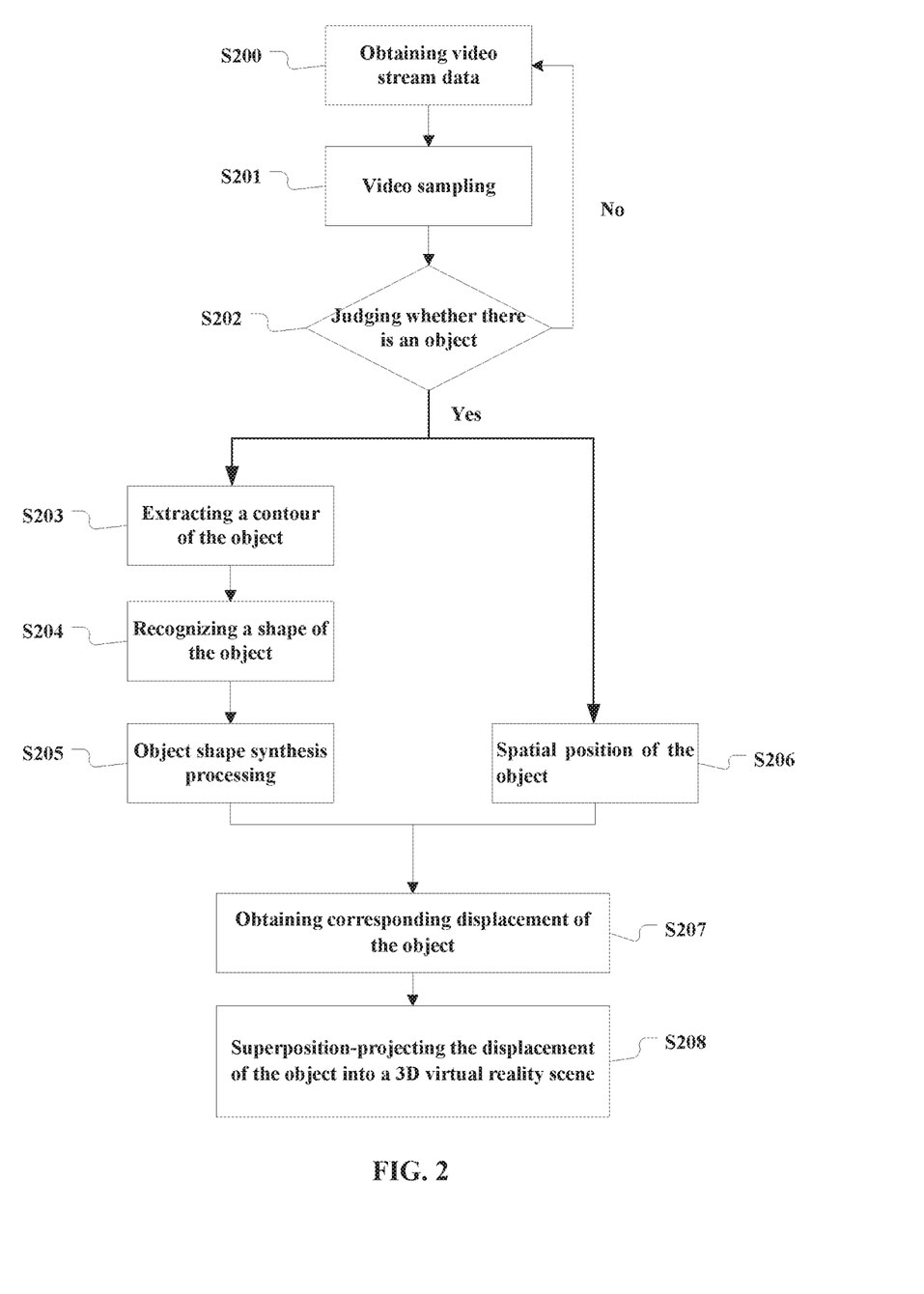
FIG. 2 is a flow diagram of a technology for reproducing an object on a virtual reality head-mounted device provided by an embodiment of the present disclosure.

In that, the technical procedure of obtaining the displacement of the object according to the video stream data, and reproducing the displacement of the object in the 3D virtual reality head-mounted device is illustrated in FIG. 2:

S200: obtaining two channels of video stream data acquired by the front camera and the bottom camera in real time at different angles;

S201: performing a video sampling processing of the two channels of video stream data at a current timing, respectively, to obtain corresponding video image;

S202: judging whether an object exists in the video image; if so, turning to step S203; and if not, obtaining the video stream data at the next timing;

S203: performing a binarization processing of the video image data to extract object contour information;

S204: recognizing a current shape of the object from the object contour information according to a preset object model;

S205: synthetizing shapes of the object recognized after the two channels of video stream data are sampled, so as to obtain a shape of the object containing more information of the object;

S206: obtaining spatial position variation information of the object;

S207: obtaining a corresponding displacement of the shape of the object varying in real time according to variation information of the contact of the object and the spatial position variation information of the object using a Hidden Markov Model (HMM) dynamic object recognizing method;

S208: superposition-projecting the displacement of the object into a 3D virtual reality scene.

This embodiment applies a system for reproducing an object in a 3D scene into a virtual reality head-mounted device, and can reproduce the object in the virtual reality head-mounted device through the system for reproducing an object in a 3D scene to display the changes of the shape and the displacement of the object in the virtual reality head-mounted device in real time, thereby improving the user's experience.

Figure 3:
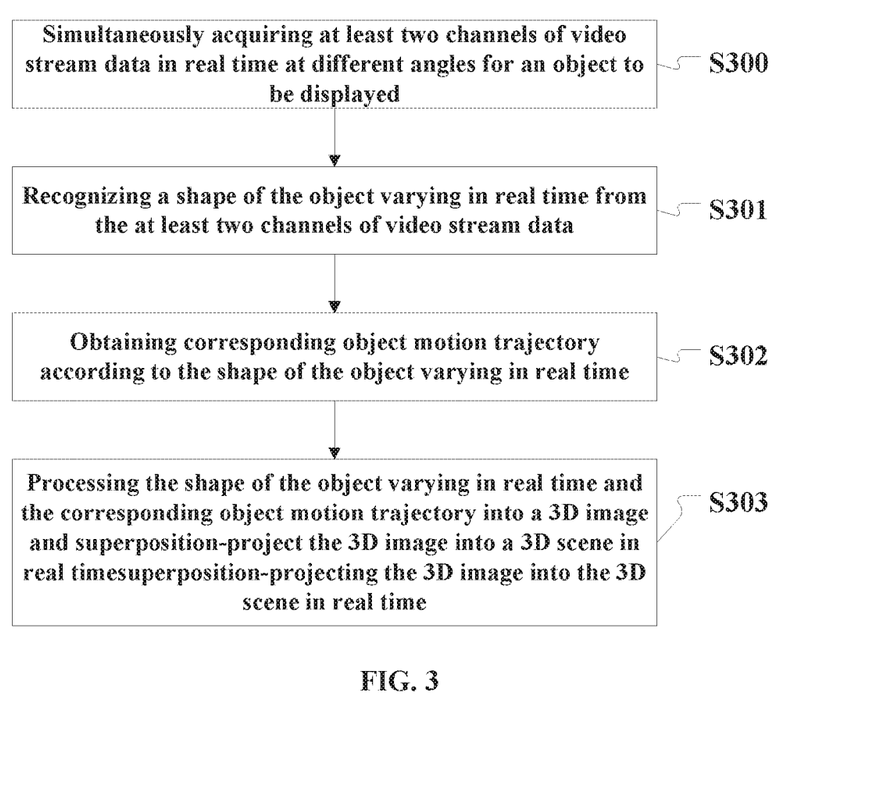
FIG. 3 is a flow diagram of a method for reproducing an object in a 3D scene provided by an embodiment of the present disclosure.

FIG. 3 is a flow diagram of a method for reproducing an object in a 3D scene provided by an embodiment of the present disclosure. The method comprises:

S300: simultaneously acquiring at least two channels of video stream data in real time at different angles for an object to be displayed.

S301: recognizing a shape of the object varying in real time from the at least two channels of video stream data.

Specifically, performing a sampling processing of each of the at least two channels of video stream data to obtain video image data sampled each time;

judging whether the video image data contain an object, and if so, performing a binarization processing of the video image data to extract object contour information;

recognizing a shape of the object corresponding to the object contour information from a preset object model database;

synthetizing shapes of the object recognized after each sampling of respective channels of video stream data to obtain a shape of the object varying in real time.

S302: obtaining corresponding object motion trajectory according to the shape of the object varying in real time.

Specifically, obtaining relative spatial position information of the shape of the object varying in real time;

obtaining variation information of a determined contact on the shape of the object varying in real time, according to the contact on the shape of the object varying in real time, wherein the contact is a characteristic key point for identifying the object;

obtaining corresponding object motion trajectory from a preset motion trajectory database, according to the relative spatial position information and the variation information of the contact.

In that, the obtaining relative spatial position information of the shape of the object varying in real time comprises:

obtaining angle information with the shape of the object varied, from video image information of the at least two channels of video data streams;

obtaining distance information of the object according to the angle information with the shape of the object varied, or sensing distance information of the object in real time through a distance sensor;

obtaining the relative spatial position information of the object according to the angle information with the shape of the object varied and the distance information of the object.

S303: processing the shape of the object varying in real time and the corresponding object motion trajectory into a 3D image and superposition-projecting the 3D image into the 3D scene in real time.

Preferably, projecting the 3D image into the 3D scene according to a screen splitting technology.

In conclusion, the embodiments of the present disclosure disclose a system and a method for reproducing an object in a 3D scene. In the system, the object acquiring unit simultaneously acquires at least two channels of video stream data in real time at different angles for an object to be displayed; the object recognizing unit recognizes a shape of the object having complete information of the object from the at least two channels of video stream data; the object tracking unit obtains corresponding object motion trajectory of the shape of the object varying in real time; and the object projecting unit processes the shape of the object varying in real time and the corresponding object motion trajectory into a 3D image, and superposition-projects the 3D image into the 3D scene in real time, thereby achieving the purpose of displaying the real object in the 3D scene. As compared with the prior art, the present disclosure does not need to redraft the object to be displayed according to the shapes of the object in the database, and can directly and really display the acquired image of the object, so as to improve the user's usage experience.

The above descriptions are just preferred embodiments of the present disclosure, rather than limitations to the protection scope of the present disclosure. Any amendment, equivalent replacement, improvement, etc. made within the spirit and principle of the present disclosure shall fall within the protection scope of the present disclosure.

The invention claimed is:

1. A method for reproducing single object in motion in a 3D scene, comprising:
   simultaneously acquiring at least two channels of video stream data in real time at different angles for single object to be displayed;
   recognizing a shape of the single object varying in real time from the at least two channels of video stream data;
   obtaining corresponding object motion trajectory according to the shape of the single object varying in real time; and processing the shape of the single object varying in real time and the corresponding object motion trajectory into a 3D image and superposition-displaying the 3D image on the 3D scene in real time;

wherein the recognizing a shape of the single object varying in real time from the at least two channels of video stream data comprises:

performing a sampling processing of each of the at least two channels of video stream data to obtain video image data sampled each time;

judging whether the video image data contain an single object, and if so, performing a binarization processing of the video image data to extract single object contour information;

recognizing a shape of the single object corresponding to the single object contour information from a preset single object model database; and synthesizing shapes of the single object recognized after each sampling of respective channels of video stream data to obtain a shape of the single object varying in real time;

wherein the obtaining corresponding object motion trajectory according to the shape of the single object varying in real time comprises:

obtaining relative spatial position information of the shape of the single object varying in real time;

obtaining variation information of a determined contact on the shape of the single object varying in real time, according to the contact on the shape of the single object varying in real time, wherein the contact is a characteristic key point for identifying the single object; and obtaining corresponding object motion trajectory from a preset motion trajectory database, according to the relative spatial position information and the variation information of the contact;

and wherein, the obtaining relative spatial position information of the shape of the single object varying in real time comprises:

obtaining angle information with the shape of the single object varied, from video image information of the at least two channels of video data streams;

sensing distance information of the single object in real time through a distance sensor; and obtaining the relative spatial position information of the single object according to the angle information with the shape of the single object varied and the distance information of the single object.

2. A method for reproducing single object in motion in a 3D scene in a virtual reality head mounted display, comprising:

simultaneously acquiring at least two channels of video stream data in real time at different angles for single object to be displayed;

recognizing a shape of the single object varying in real time from the at least two channels of video stream data;

obtaining corresponding object motion trajectory according to the shape of the single object varying in real time; and processing the shape of the single object varying in real time and the corresponding object motion trajectory into a 3D image and superposition-displaying the 3D image just including the single object on the 3D scene in the display in real time, wherein the obtaining corresponding object motion trajectory according to the shape of the single object varying in real time comprises:

obtaining relative spatial position information of the shape of the single object varying in real time;

obtaining variation information of a determined contact on the shape of the single object varying in real time, according to the contact on the shape of the single object varying in real time, wherein the contact is a characteristic key point for identifying the single object; and obtaining corresponding object motion trajectory from a preset motion trajectory database, according to the relative spatial position information and the variation information of the contact, and wherein, the obtaining relative spatial position information of the shape of the single object varying in real time comprises:

obtaining angle information with the shape of the single object varied, from video image information of the at least two channels of video data streams;

sensing distance information of the single object in real time through a distance sensor; and obtaining the relative spatial position information of the single object according to the angle information with the shape of the single object varied and the distance information of the single object.

3. The method according to claim 2, wherein the recognizing a shape of the single object varying in real time from the at least two channels of video stream data comprises:

performing a sampling processing of each of the at least two channels of video stream data to obtain video image data sampled each time;

judging whether the video image data contain the single object, and if so, performing a binarization processing of the video image data to extract object contour information;

recognizing a shape of the single object corresponding to the single object contour information from a preset object model database; and synthesizing shapes of the single object recognized after each sampling of respective channels of video stream data to obtain a shape of the single object varying in real time.

4. The method according to claim 2, wherein the key point is each articulation point of the single object in motion.

5. The method according to claim 2, wherein recognizing a shape of the single object varying in real time from the at least two channels of video stream data comprises:

recognizing a shape of the single object having complete object information from the at least two channels of video stream data.

6. A virtual reality head-mounted device comprises a display screen, the display screen configured to display a 3D virtual reality scene and a reproducing single object in motion, wherein said reproducing single object in motion is realized by the following scheme:

simultaneously acquiring at least two channels of video stream data in real time at different angles for the single object to be displayed;

recognizing a shape of the single object varying in real time from the at least two channels of video stream data;

obtaining corresponding object motion trajectory according to the shape of the single object varying in real time; and processing the shape of the single object varying in real time and the corresponding object motion trajectory into a 3D image and superposition-displaying the 3D image just including the single object on the 3D scene in the display in real time, wherein, the obtaining corresponding object motion trajectory according to the shape of the single object varying in real time comprises:

obtaining relative spatial position information of the shape of the single object varying in real time;

obtaining variation information of a determined contact on the shape of the single object varying in real time, according to the contact on the shape of the single object varying in real time, wherein the contact is a characteristic key point for identifying the single object; and obtaining corresponding object motion trajectory from a preset motion trajectory database, according to the relative spatial position information and the variation information of the contact, and wherein, the obtaining relative spatial position information of the shape of the single object varying in real time comprises:

obtaining angle information with the shape of the single object varied, from video image information of the at least two channels of video data streams;

sensing distance information of the single object in real time through a distance sensor; and obtaining the relative spatial position information of the single object according to the angle information with the shape of the single object varied and the distance information of the single object.

7. The virtual reality head-mounted device according to claim 6, wherein the recognizing a shape of the single object varying in real time from the at least two channels of video stream data comprises:

performing a sampling processing of each of the at least two channels of video stream data to obtain video image data sampled each time;

judging whether the video image data contain the single object, and if so, performing a binarization processing of the video image data to extract object contour information;

recognizing a shape of the single object corresponding to the single object contour information from a preset object model database; and synthetizing shapes of the single object recognized after each sampling of respective channels of video stream data to obtain a shape of the single object varying in real time.

8. The virtual reality head-mounted device according to claim 6, wherein recognizing a shape of the single object varying in real time from the at least two channels of video stream data comprises:

recognizing a shape of the single object having complete object information from the at least two channels of video stream data.

* * * * *